United States Patent
Hudson et al.

(10) Patent No.: US 10,063,185 B2
(45) Date of Patent: Aug. 28, 2018

(54) RETRACTABLE WIRING SYSTEM FOR A PHOTOVOLTAIC MODULE

(71) Applicant: SolarCity Corporation, San Mateo, CA (US)

(72) Inventors: Tyrus Hudson, San Rafael, CA (US); Johann Karkheck, San Rafael, CA (US); Brian Atchley, San Rafael, CA (US); River Broussard, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 206 days.

(21) Appl. No.: 14/985,213

(22) Filed: Dec. 30, 2015

(65) Prior Publication Data

US 2016/0308489 A1   Oct. 20, 2016

Related U.S. Application Data

(60) Provisional application No. 62/149,218, filed on Apr. 17, 2015.

(51) Int. Cl.
| H01L 31/00 | (2006.01) |
|---|---|
| H02S 40/36 | (2014.01) |
| H02S 40/34 | (2014.01) |

(52) U.S. Cl.
CPC ............. *H02S 40/36* (2014.12); *H02S 40/34* (2014.12)

(58) Field of Classification Search
None
See application file for complete search history.

(56) References Cited

U.S. PATENT DOCUMENTS

| 8,938,919 B2 | 1/2015 | Cinnamon et al. |
|---|---|---|
| 8,971,046 B2 | 3/2015 | Solon |
| 2011/0240089 A1 | 10/2011 | Wootton |
| 2011/0290307 A1 | 12/2011 | Workman et al. |
| 2012/0037202 A1 | 2/2012 | Gosnell |
| 2013/0048046 A1 | 2/2013 | Domsic et al. |
| 2013/0075152 A1 | 3/2013 | Mazzone |

(Continued)

FOREIGN PATENT DOCUMENTS

| CN | 103124036 A | 5/2013 |
|---|---|---|
| DE | 102005008123 A1 | 9/2006 |

(Continued)

*Primary Examiner* — Shannon M Gardner
(74) *Attorney, Agent, or Firm* — Kilpatrick Townsend & Stockton LLP

(57) ABSTRACT

Systems and methods for assembling and wiring photovoltaic arrays are provided. The wiring systems can include retractable wires included in photovoltaic modules that may be extended during installation of photovoltaic modules in the array to connect to wires of adjacent photovoltaic modules, which can retract into a tightened position under the array as the installation is completed. The wires may be made retractable by wire retraction mechanisms mounted to a frame of the photovoltaic module, which maintain a desired tension on the wires of the photovoltaic module. The wire retraction mechanism may include springs that urge components connected to the wire to rotate a particular direction so as to maintain tension on the wire. The wiring systems may also have wire guides to keep the wires accessible for installation and adjustment.

19 Claims, 17 Drawing Sheets

(56) References Cited

U.S. PATENT DOCUMENTS

2013/0228212 A1 9/2013 Yen et al.
2015/0214889 A1 7/2015 Nam et al.
2017/0187328 A1* 6/2017 Miljkovic ............... H02S 40/34

FOREIGN PATENT DOCUMENTS

| DE | 102012102214 B3 | 2/2013 |
| EP | 2698887 A1 | 2/2014 |
| WO | 2013000753 A2 | 1/2013 |
| WO | 2014086914 A1 | 6/2014 |

* cited by examiner

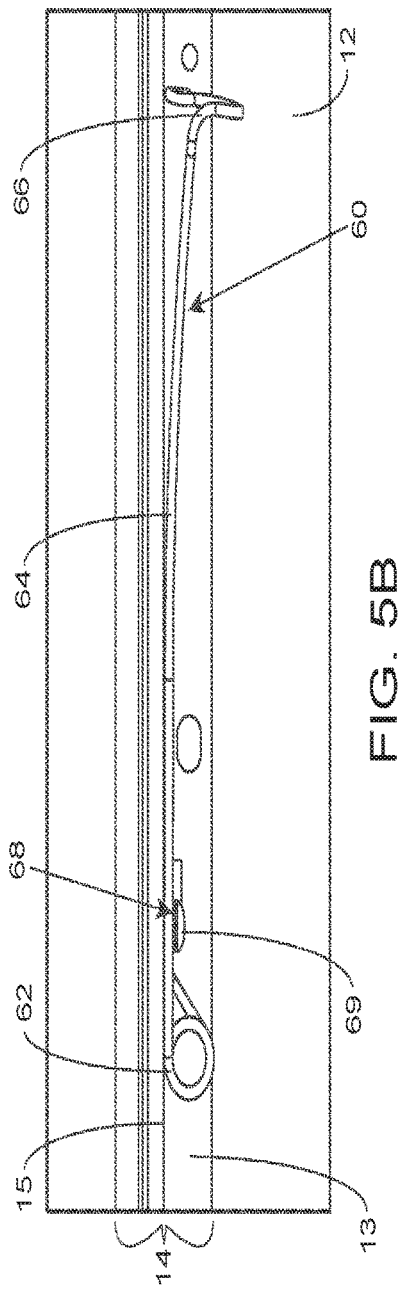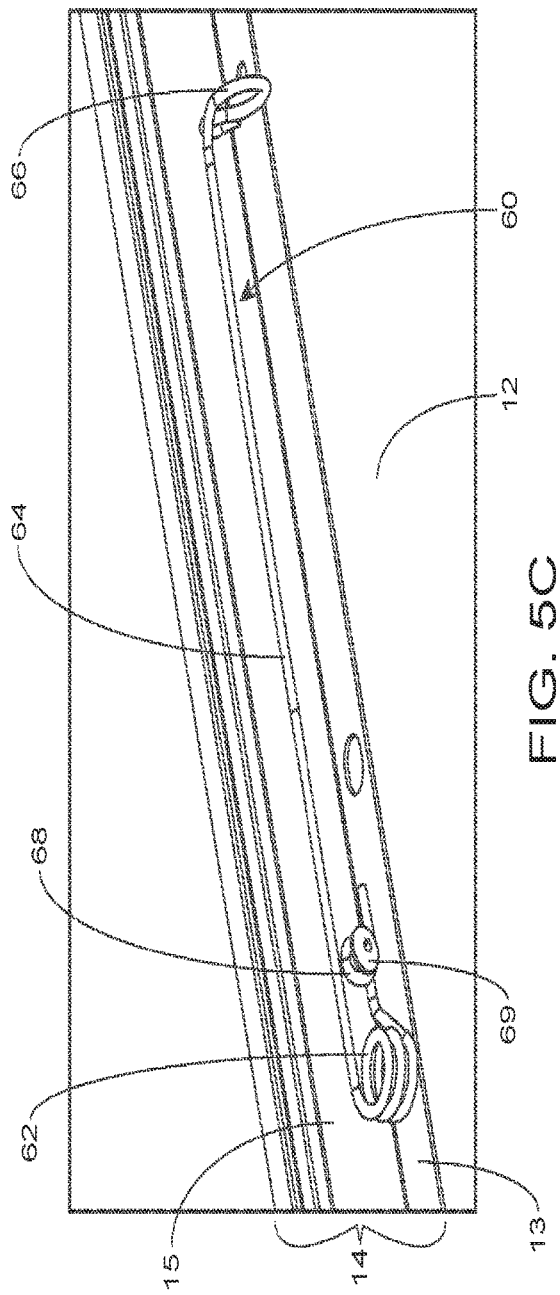

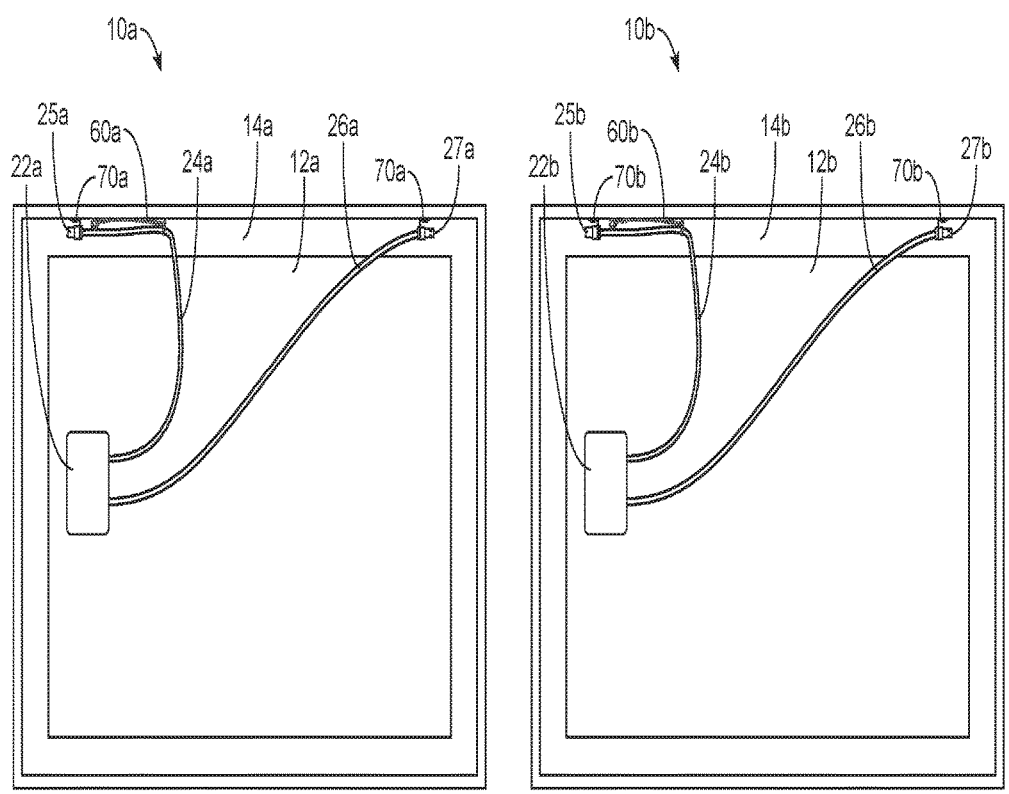

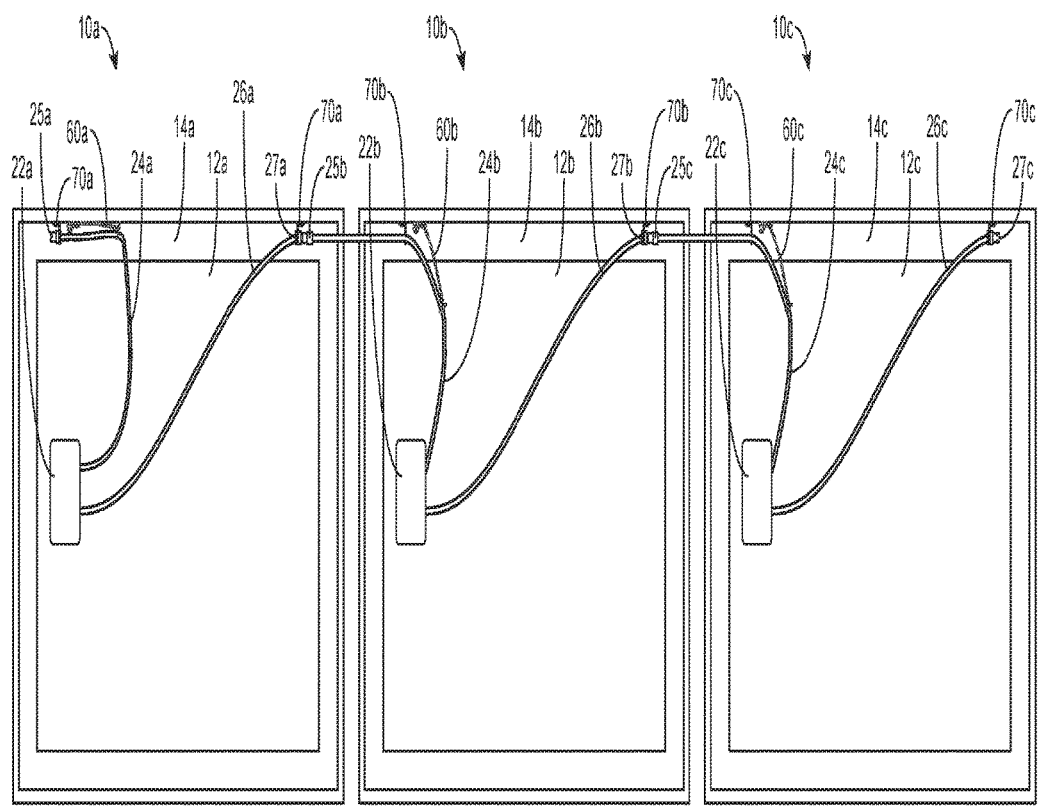

RETRACTABLE WIRING SYSTEM FOR A PHOTOVOLTAIC MODULE

CROSS-REFERENCES TO RELATED APPLICATIONS

This claims the benefit of U.S. Provisional Application No. 62/149,218, filed Apr. 17, 2015, the disclosure of which is incorporated herein by reference in its entirety for all purposes.

FIELD OF THE INVENTION

Embodiments of the invention pertain to photovoltaic modules and systems for assembling photovoltaic arrays.

BACKGROUND OF THE INVENTION

Assembling photovoltaic arrays is typically a time consuming process. Improvements are therefore always desired to make array assembly faster, easier, more consistent, and less expensive. By reducing the time taken to assemble the array, the overall system cost is reduced. Photovoltaic arrays typically require both mechanical assembly and electrical coupling of wiring systems configured to capture, transfer, and/or manage the electricity for energy consumption. Since each photovoltaic module in a photovoltaic array usually includes a wiring system, wire management can be a complex process that takes up a significant portion of the time of installation.

Typically, photovoltaic module wiring systems may include a junction box mounted to the back side of each photovoltaic module and a pair of wires—one connected to a positive terminal of the junction box and one connected to a negative terminal of the junction box, for example—that electrically couple the module to other components for energy transfer and/or management. In some instances, it is desirable to electrically couple one or more of the photovoltaic modules in a given photovoltaic array to each other in series to form a string and to achieve the desired energy. For example, each photovoltaic module in a given row may be electrically coupled to both adjacent photovoltaic modules in the row (one on either side) via the pairs of wires of the junction box of each module. Such electrical coupling typically must be done at the installation sites of the photovoltaic arrays.

Upon arrival at the installation site, photovoltaic modules typically come with the wiring temporarily bunched together and/or temporarily mounted to the photovoltaic module using wire-ties, clips, or other temporary fasteners. Prior to installation, installers typically remove the temporary fasteners so that the wires are free and accessible for electrical connection. However, since the wiring requires a certain amount of slack wire to allow for connection to the next module in the array, or to other components, the free wires often interfere with installation. Moreover, the wiring must be accessible as each successive module is installed so that the modules can be electrically coupled as desired. Furthermore, once installed and electrically connected, it is important to avoid sagging wires that may be aesthetically unpleasing and hazardous.

To address these issues, installers typically attempt to manage wires prior to moving the panels to the roof (e.g., while on the ground) and/or by applying (or re-applying) wire clips or other fasteners to the wires as each module is installed. For example, installers may keep a number of clips or other fasteners on hand during installation and apply them to portions of the wires to affix them to module frames or other module components as installation proceeds. However, because of the necessary slack required in the wires for connection flexibility and the need for the wires to be accessible during installation, wire management by clips or other fasteners may require a time-consuming process of affixing, removing, and adjusting wire clips that significantly increases installation time and reduces quality of how wires are managed.

For example, for coupling two modules, the installer may first affix the wires of a first module to a convenient location for accessibility using clips, install the first module on the roof, affix the wires of the next module to a convenient location using additional clips, install the second module on the roof, remove the clips from one or both sets of wires to connect the wires and then re-affix some or all of the clips to keep the wires in a desired position close to the modules to keep them from sagging. This process may be repeated for each subsequent module.

In addition to the lengthy process described above, if a wire connection or clip fails or is improperly installed, in many cases, the wires of multiple modules may be become inaccessible which requires fishing beneath modules (using elongated tools in many cases) and in some cases even uninstallation of one or many modules and reinstallation using the process described above. Accordingly, improvement in both the installation time and quality of wire management is desirable.

BRIEF SUMMARY OF THE INVENTION

The present invention provides a photovoltaic module having a retractable wiring system. The retractable wires may be extended during installation of the modules in the array, but may snap back into a tightened position under the array as the installation is completed. The wires may be made retractable by wire retraction mechanisms mounted to a frame of the photovoltaic module, which maintain a desired tension on the wires of the photovoltaic module. The wire retraction mechanism may include springs that urge components connected to the wire to rotate a particular direction so as to maintain tension on the wire.

One advantage of the present retractable wire system is that it can be used to make module installation fast and easy. Another advantage of the present retractable wire system is that it can be operated by an installer, connecting module-to-module wiring with one hand while pivot-lowering the modules into their installed position. Yet another advantage is that the wire retraction mechanism assists in lifting the wires away from the roof surface (thereby minimizing, or eliminating, the need for wire clips affixed during installation to hold the wires to the modules frames). Yet another advantage of this approach is that it prevents sagging wires, which could catch debris on the roof creating a risk of, pests and/or fire and which are visually unappealing. The wires may also be damaged through abrading on the roof surface over time.

BRIEF DESCRIPTION OF THE DRAWINGS

FIG. 5B shows a close-up view of a portion of the retractable wiring system shown in FIG. 5A, according to one embodiment of the invention.

FIG. 5C shows a close-up perspective view of a portion of the retractable wiring system shown in FIGS. 5A and 5B, according to one embodiment of the invention.

FIG. 8A shows a bottom view of two successive photovoltaic modules with retractable wiring systems as shown in FIGS. 5A-5C prior to being electrically connected, according to one embodiment of the invention.

FIG. 9B shows three successive photovoltaic modules with retractable wiring systems as shown in FIGS. 5A-5C after installation and connection, according to one embodiment of the invention.

DETAILED DESCRIPTION OF THE INVENTION

Figure 1:
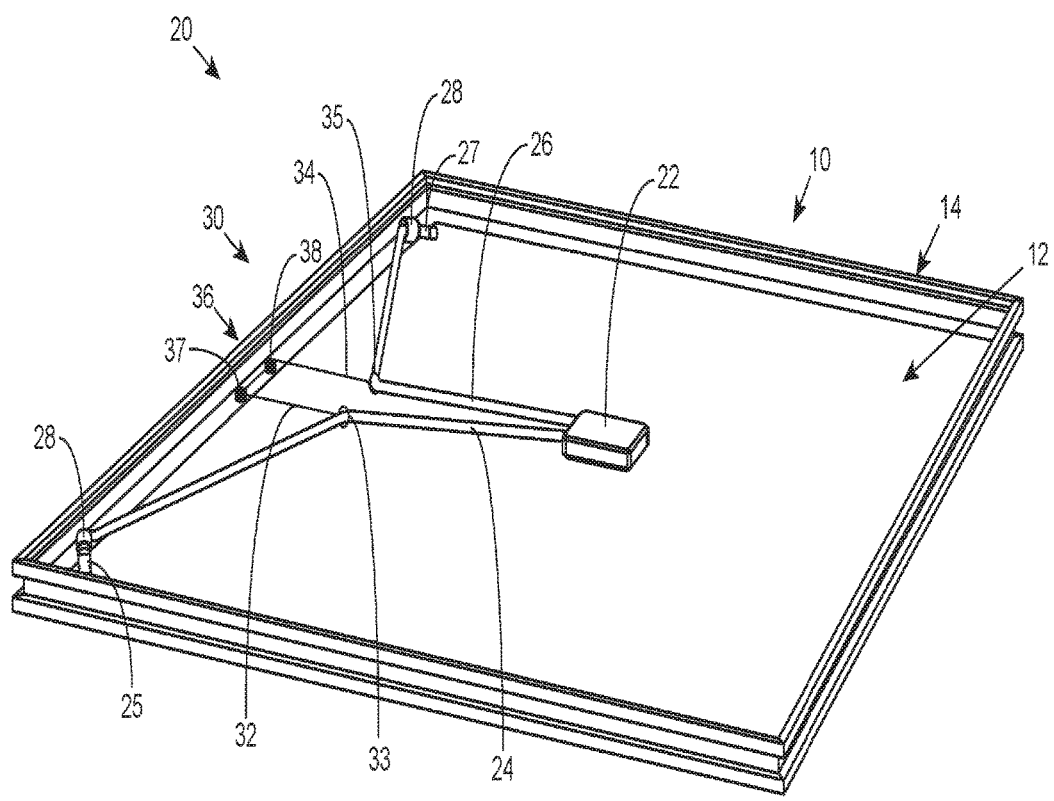
FIG. 1 shows a perspective view of a photovoltaic module having a retractable wiring system according to one embodiment of the invention.
Figure 2:
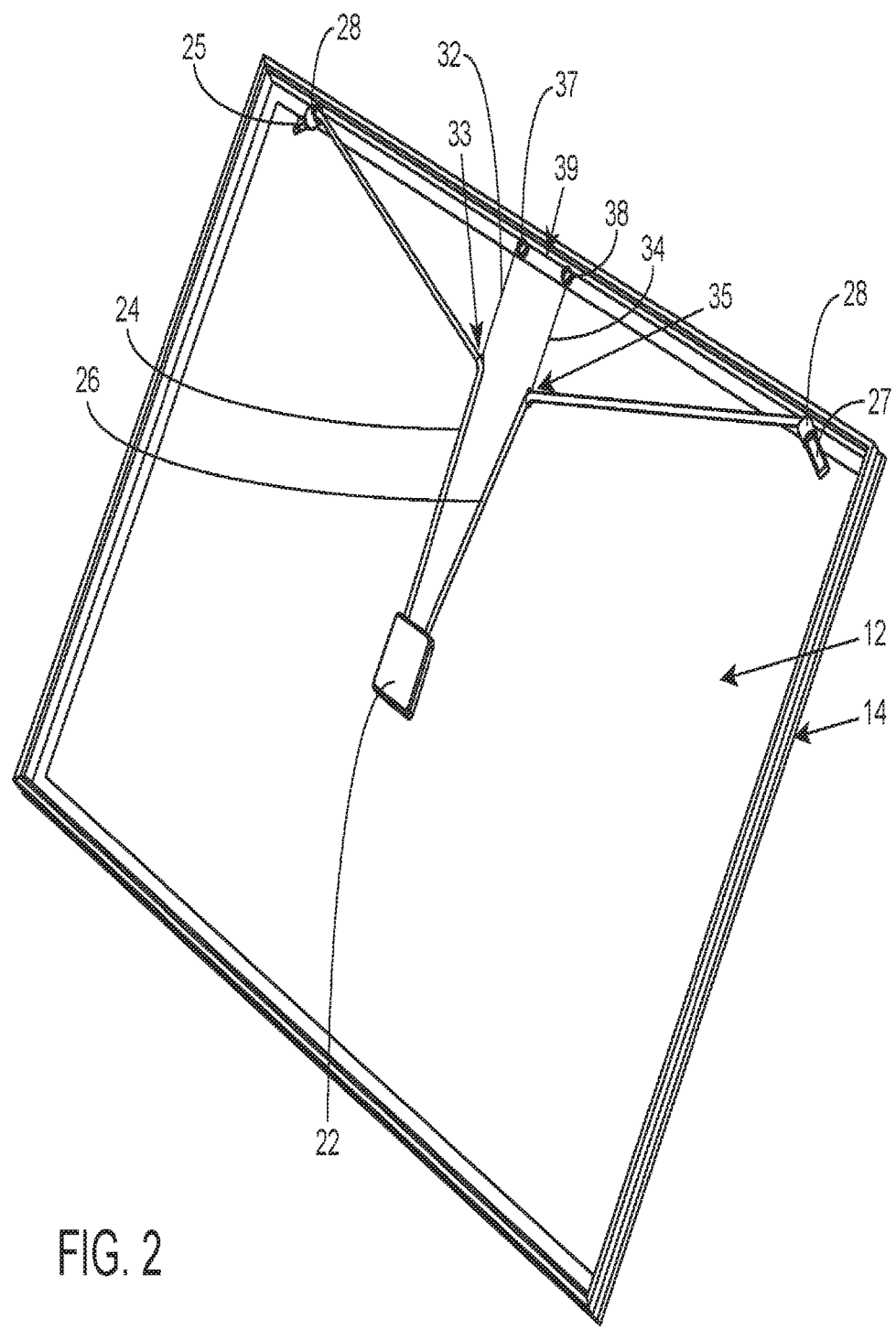
FIG. 2 shows a perspective view of the module of FIG. 1 from a different angle.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosure. Thus, the invention is not limited to the embodiments described and shown.

Referring first to FIGS. 1 to 4, photovoltaic module 10 having retractable wiring system 20 is provided according to one embodiment of the invention. For ease of reference, FIGS. 1-4 each show photovoltaic module 10 oriented in an upside-down manner with respect to its installed position so that the surface of photovoltaic module 10 facing upwards in the figures typically faces downwards towards the supporting structure (such as the roof) when installed. Photovoltaic module 10 may include photovoltaic panel 12 and frame 14. Frame 14 may support photovoltaic panel 12 and allow photovoltaic module 10 to be mechanically coupled to other photovoltaic modules similar to photovoltaic module 10 and/or to supporting structures such as a roof so as to form a photovoltaic array.

Retractable wiring system 20 may include junction-box 22 mounted onto photovoltaic panel 12, and wires 24 and 26 extending from junction-box 22. As used herein, the term "wire" may refer to an insulated cable having a solid or stranded core of electrically conductive materials. It will be understood by those skilled in the art that wires 24 and 26 may include any suitable conductive materials, for example aluminum or copper conductive materials, and any suitable insulation materials. Although junction-box 22 is shown mounted to a central location of photovoltaic panel 12, it will be understood that junction-box may be mounted in any suitable location. In some embodiments junction-box 22 may be mounted in any standard location as is used by those skilled in the art. Junction-box 22 may include a positive and a negative terminal to which wires 24 and 26 may be coupled. Wires 24 and 26 may each terminate in connectors 25 and 27 respectively. In some embodiments, wires 24 and 26 each couple to corresponding wires of successive photovoltaic modules in a photovoltaic array. For example, connectors 25 and 27 may each mate with corresponding connectors of wires from two successive photovoltaic modules, so that connector 25 couples wire 24 to a wire of one photovoltaic module and connector 27 couples wire 26 to a wire of another photovoltaic module. In some embodiments, wires 24 and 26 may provide positive and negative electrical connections, respectively, to junction boxes of adjacent photovoltaic modules, and each of wires 24 and 26 connects with the corresponding connection of two adjacent photovoltaic modules. For example, wire 24 may connect a positive terminal of junction-box 22 to a negative terminal of a junction-box of one adjacent photovoltaic module via a wire connected thereto, and wire 26 may connect a negative terminal of junction-box 22 to a positive terminal of a junction-box of another adjacent photovoltaic module via another wire connected thereto.

Retractable wiring system 20 may further include wire guides 28 and wire retraction mechanism 30. Wire guides 28 may be mounted onto frame 14, and the ends of the wires 24 and 26 may be received into wire guides 28 as shown. In some embodiments, wire guides 28 may be mounted to frame 14 during manufacturing and/or assembly of frame 14. In some embodiments, wire guides 28 may be mounted to frame 14 during assembly of frame 14 with photovoltaic panel 12. In some embodiments, wire guides 28 may be mounted to frame 14 prior to distribution of modules 10. It will be understood that mounting wire guides 28 during manufacturing and/or assembly as described may reduce installation time and improve quality. Wire retraction mechanism 30 may maintain tension on wires 24 and 26. In other words, wire retraction mechanism 30 may pull on each of wires 24 and 26 to pull connectors 25 and 27 on the ends of the wires back towards their respective wire guide 28. Preferably, wire guides 28 are dimensioned to seat connectors 25 and 27 therein (as shown) as wire retraction mechanism 30 maintains tension on wires 24 and 26.

Figure 4:
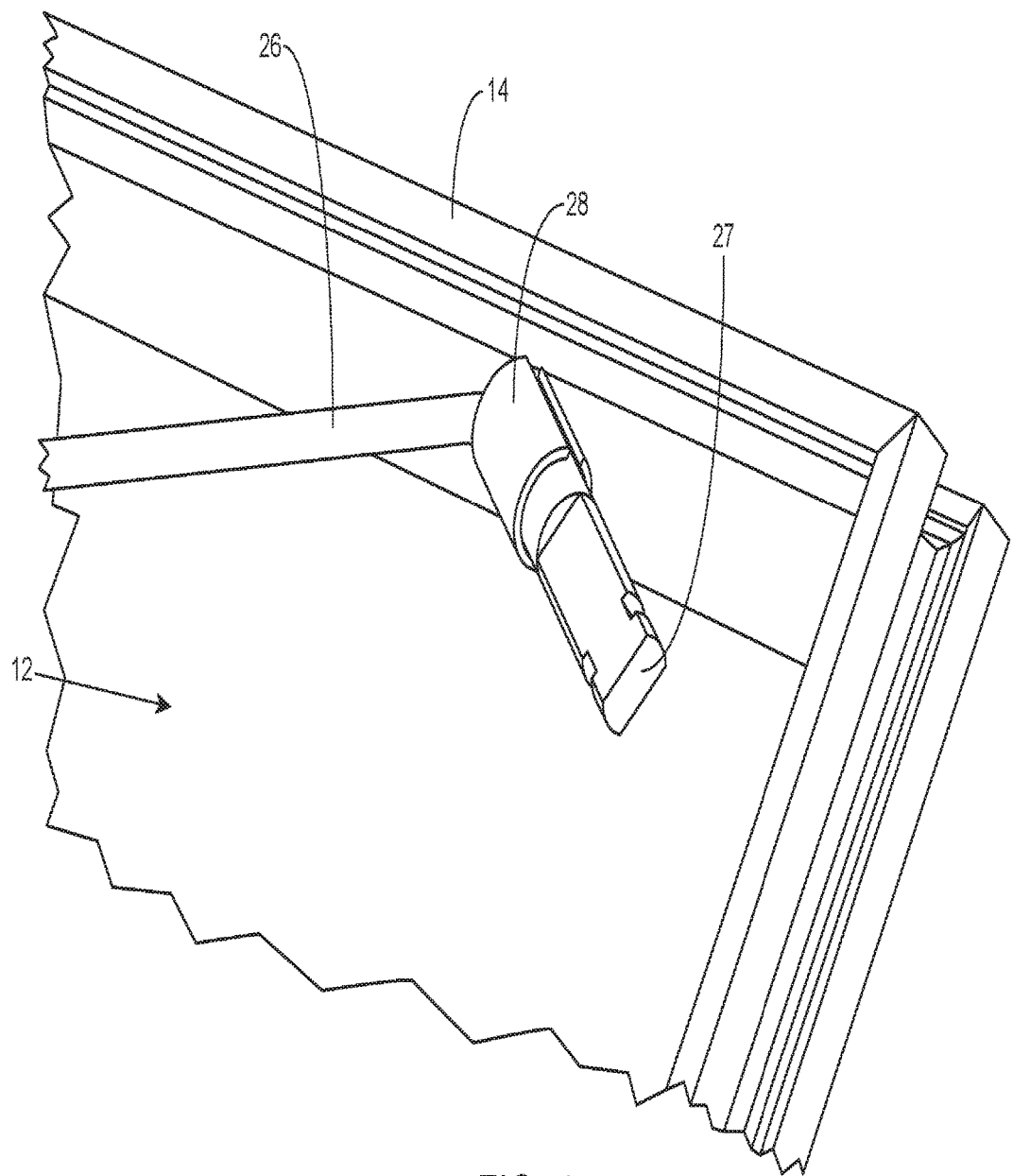
FIG. 4 shows a close-up perspective view of one of the wire ends with a connector seated in a wire guide.

As can be seen in FIG. 4, in some embodiments, wire guide 28 may be oriented so that it angles connector 27 downwardly (i.e. away from the plane of the photovoltaic laminate at the top of the photovoltaic module) when connector 27 sits in wire guide 28. An advantage of this feature is that the 26 will tend to be pulled out in a slightly downward direction when extended. It will be understood that this orientation keeps connector 27 accessible but avoids connector 27 from hitting the side of frame 14 when extending wire 26.

Figure 3:
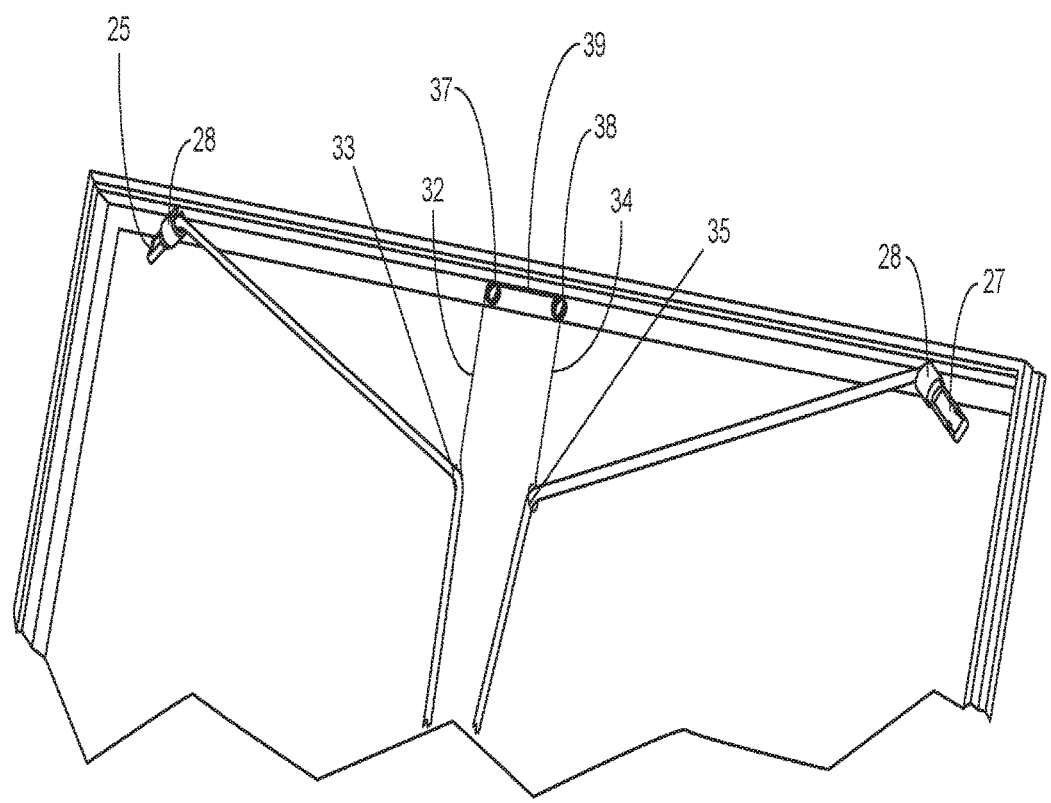
FIG. 3 shows a close-up perspective view of the retractable wiring system of FIG. 1.

In the embodiment shown in FIGS. 1-4, wire retraction mechanism 30 may include a pair of rotating lever arms 32 and 34 mounted onto frame 14, and spring bias 36 urging lever arms 32 and 34 to rotate inwardly (i.e. away from wire guides 28) such that lever arms 32 and 34 maintain tension on wires 24 and 26. As seen best in FIG. 3, rotating lever arms 32 and 34 may each have free ends 33 and 35 that hold wires 24 and 26 respectively. Although any suitable geometry for holding wires 24 and 26 may be used at free ends 33 and 35, in the example shown in FIGS. 1-4, free ends 33 and 35 are designed to wrap around wires 24 and 26 respectively. As seen in FIG. 3, free ends 33 and 35 may include partial loops that allow wires 24 and 26 to be inserted (prior to or during installation) and removed if necessary. The gap in the partial loop may be sized so that free ends 33 and 35 remain wrapped around wires 24 and 26 during installation and normal operation. It will be understood that rotating lever arms 32 and 34 may be made from any suitable material. Preferably, rotating lever arms 32 and 34 may be made from a material with rounded edges so as not to cut into or otherwise damage wires 24 and 26. For example, rotating lever arms 32 and 34 may be made of a substantially rigid wire form with rounded edges. As used herein, the term "substantially rigid" means rigid enough so as not to deform upon application of typical forces applied by an installer when extending wires 24 and 26 to connect to adjacent photovoltaic modules.

As described above with respect to wire guides 28, it will be understood that in some embodiments, wire retraction mechanism 30 may be mounted to frame 14 during manufacturing and/or assembly of frame 14. In some embodiments, wire retraction mechanism 30 may be mounted to frame 14 during assembly of frame 14 with photovoltaic panel 12. In some embodiments, wire retraction mechanism 30 may be mounted to frame 14 prior to distribution of modules 10. It will be understood that mounting wire retraction mechanism 30 during manufacturing and/or assembly as described may reduce installation time and improve quality.

Spring bias 36 may include springs 37 and 38, providing spring bias for urging inward rotation of levers 32 and 34 respectively. In some embodiments, spring 37 and rotating lever arm 32 may be made from a single wire form, with spring 37 disposed at the end opposite of free end 33. In some embodiments, the single wire form including spring 37 and rotating lever arm 32 may also include a connection point (not shown) for mounting the wire form to frame 14. Any suitable connection point may be used to mount wire form to frame 14. For example, wire form may include a loop that receives a screw that may mount wire form to frame 14. Similarly, in some embodiments, spring 38 and rotating lever arm 34 may be made from another single wire form and mounted to frame 14 in a manner similar to spring 37 and rotating lever arm 34. In some embodiments, rotating lever arm 32, spring 37, spring 38, and rotating lever arm 34 may all be made from a single wire form mounted to frame 14. For example, springs 37 and 38 may be coupled by connecting portion 39 of wire form as shown most clearly in FIG. 3. Although not shown in FIGS. 1-4, one or two connection points (such as loops described above) may be disposed between springs 37 and 38 on connecting portion 39.

In some embodiments, rotating lever arm 32 may provide a greater tension force to wire 24 than rotating lever arm 34 provides to wire 26 (or vice versa). One advantage of providing greater tension on one wire than the other may be that when wire 24 from a first module is connected to wire 26 from a second module, the wires will spring back into position such that the connection point between the ends of the two wires may be pulled harder by one module than the other. As such, the point where the two wires connect together may actually be under one module (as opposed to being equidistantly positioned between the modules, which would result in connectors 33 and 35 sitting at a location between the frames of the adjacent modules). This serves to protect the connection from being exposed to uv radiation, rain, or snow. In some embodiments, greater tension may be provided by lever arm 32 as compared to arm 34 by including a greater number of turns in spring 37 than in spring 38.

It will be understood that using photovoltaic modules 10 with retractable wiring systems 20 described in FIGS. 1-4 may allow for improved wire management during installation and wiring of photovoltaic modules. Specifically, wire retraction mechanism 30 maintains tension on wires 24 and 26 both prior to and after connection to corresponding wires 26 and 24 of adjacent photovoltaic modules 10. Such tension may keep wires 24 and 26 close to the bottom surface of photovoltaic modules 10, away from supporting surfaces (such as the roof structure) underneath photovoltaic modules, and generally free from interfering with the installation process. Moreover, even if a given connection between wires of adjacent photovoltaic modules 10 fails, tension will remain on the two free wires due to retraction mechanism 30 and/or wire guides 28, and wires of other photovoltaic modules 10 may be unaffected. Thus, any free wires may be easily accessible for reconnection without the use of tools or other implements to reach under photovoltaic modules 10, and any failures may be promptly corrected by addressing only the affected wires. Accordingly, it will be understood that using photovoltaic modules 10 with retractable wiring systems 20 may both reduce installation time and improve installation quality.

Figure 5A:
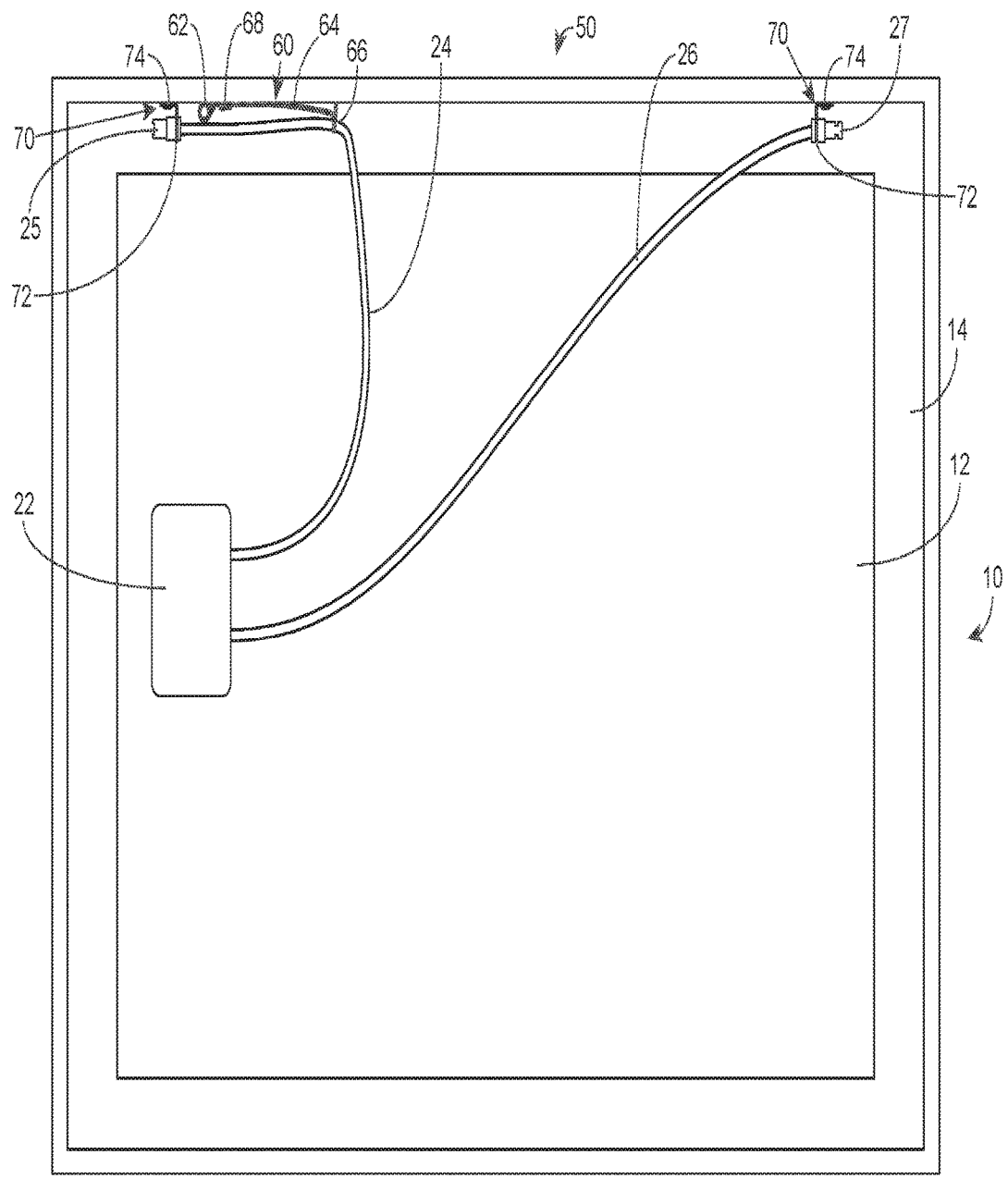
FIG. 5A shows a retractable wiring system on a photovoltaic module according to one embodiment of the invention.

FIG. 5A shows a bottom view of photovoltaic module 10 with retractable wiring system 50 according to another embodiment of the invention. Photovoltaic module 10 may include photovoltaic panel 12 and frame 14, as described above with respect to FIGS. 1-4. As with retractable wiring system 20 of FIGS. 1-4, retractable wiring system 50 may include junction-box 22 with wires 24 and 26 extending therefrom and terminating in connectors 25 and 27 respectively. As described above with respect to FIGS. 1-4, wires 24 and 26 may be connected via connectors 25 and 27 to wires of two separate adjacent photovoltaic modules so as to electrically couple positive and negative terminals of junction-box 22 to corresponding negative and positive terminals of junction boxes of two adjacent photovoltaic modules.

Figure 7:
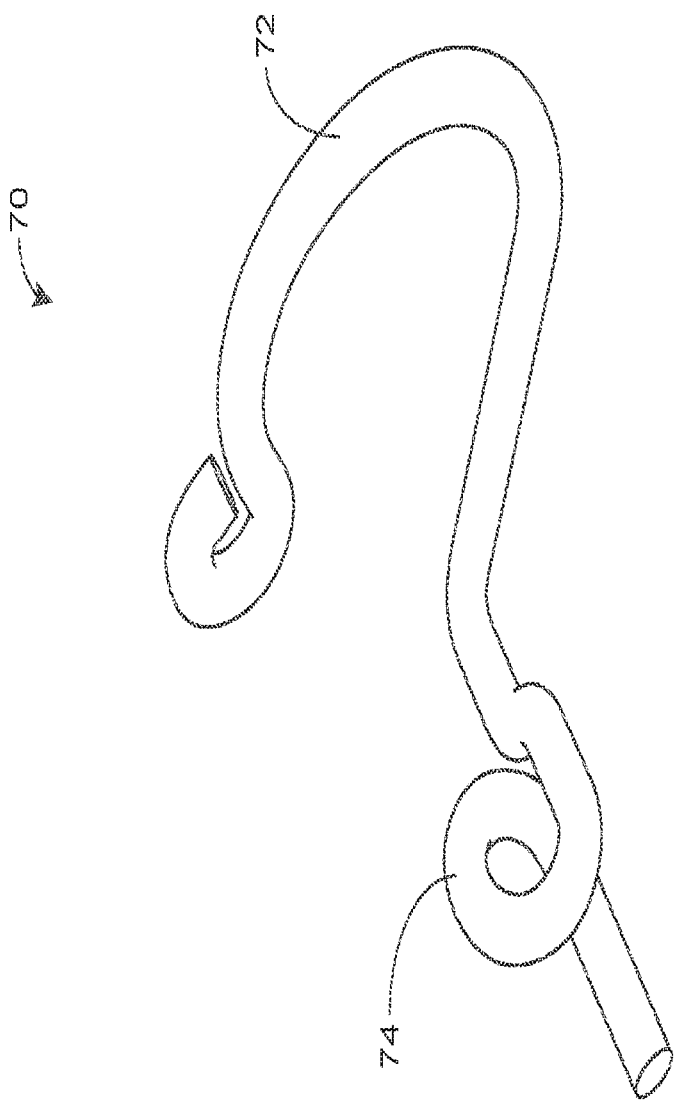
FIG. 7 shows a perspective view of the wire guide of the retractable wiring system of FIG. 5A, according to one embodiment of the invention.

Retractable wiring system 50 may also include wire retraction mechanism 60 and wire guides 70. Wire guides 70 may operate similar to wire guides 28 and may be shaped to receive the back side of connectors 25 and 27. In some embodiments, wire guides 70 may be made of a substantially rigid wire form. FIG. 7 shows wire guide 70 in accordance with one embodiment of the invention. As shown in FIG. 7, wire guides 70 may be made of a wire form with rounded edges so as to avoid cutting or otherwise damaging wires 24 or 26. Wire guides 70 may have connection point 74 for mounting wire guides to frame 14. For example, as depicted in FIG. 7, connection point 74 may include a loop made out of the wire form that receives a mounting screw for mounting wire guides onto frame 14. As shown in FIG. 7, wire guides may further include a partial looping portion 72 for receiving the back end of connectors 25 and 27.

In some embodiments, as described above with respect to wire guides 28, wire guides 70 may be mounted to frame 14 during manufacturing and/or assembly of frame 14. In some embodiments, wire guides 70 may be mounted to frame 14 during assembly of frame 14 with photovoltaic panel 12. In some embodiments, wire guides 70 may be mounted to frame 14 prior to distribution of modules 10. It will be understood that mounting wire guides 70 during manufacturing and/or assembly as described may reduce installation time and improve quality.

Wire retraction mechanism 60 may operate similarly to wire retraction mechanism 30 except that wire retraction mechanism 60 may include only one spring 62 and rotating lever 64 configured to maintain tension to only wire 24 (as opposed to both wires 24 and 26) of photovolotaic module 10. In some embodiments, wire retraction mechanism 60 may be made of a single substantially rigid wire form including connection point 68, spring 62, rotating lever 64, and free end 66. Alternatively, wire retraction mechanism 60 may include any of spring 62, rotating lever 64, and free end 66 as separate components coupled together by any suitable couplings. For example, spring 62 may have a free end coupled to a hole in frame 14 and a second end coupled to a hole at a first end of rotating lever 64.

Figure 6:
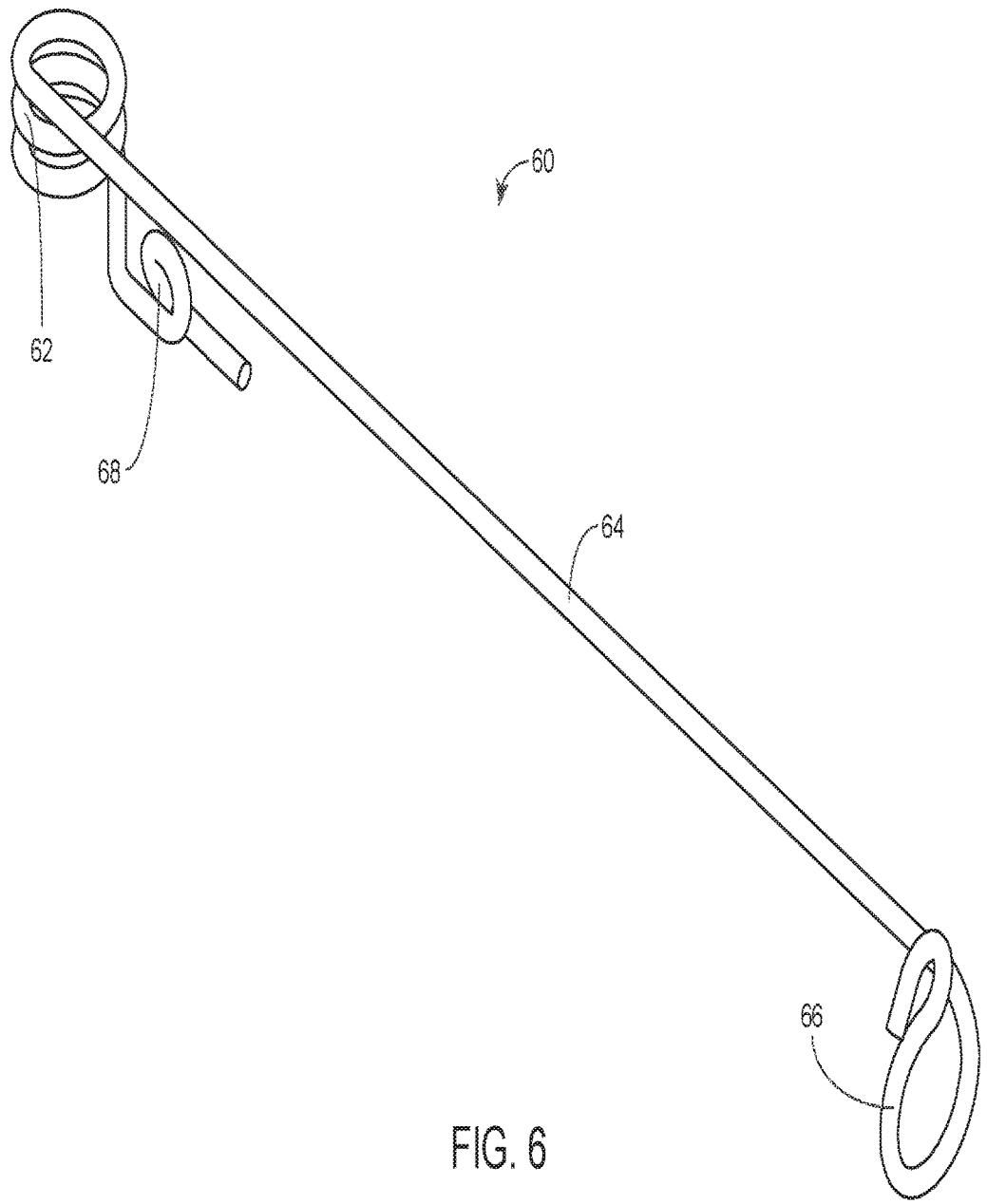
FIG. 6 shows a perspective view of the wire retraction mechanism of the retractable wiring system of FIGS. 5A-5C, according to one embodiment of the invention.

An embodiment of wire retraction mechanism 60 is shown in greater detail in FIG. 6. As depicted in FIG. 6, wire retraction mechanism 60 may be made from a single wire form with rounded edges so as to avoid cutting or otherwise damaging wire 24. Wire retraction mechanism 60 may be mounted to frame 14 via connection point 68, which is depicted for example as a loop that may receive a mounting screw or a rivet for mounting on frame 14. Spring 62 may be designed to provide a particular tension on wire 24 as will be understood by one of ordinary skill in the art. As with wire retraction mechanism 30 described above, wire retraction mechanism 60 may include rotating lever arm 64 extending from spring 62 to free end 66. Free end 66 may be shaped to receive wire 24. For example, as shown in FIG. 6, free end 66 may include a loop extending perpendicular to rotating lever arm 64 that wraps around wire 24. The loop may be designed with a gap so that wire 24 may be inserted (prior to or during installation) and removed if necessary. The gap in the partial loop may be sized so that free end 66 remains wrapped around wire 24 during installation and normal operation.

FIGS. 5B and 5C show close-up views of a portion of retractable wiring system 50 shown in FIG. 5A, in accordance with embodiments of the invention. As can be seen in FIGS. 5A and 5B, frame 14 may include flange portion 13, which attaches frame 14 to panel 12, and inner wall portion 15. As shown in FIGS. 5A and 5B, wire retraction mechanism 60 may be mounted to inner wall portion 15 of frame 14. For example, as depicted in FIG. 5C, rivet 69 may be received through connection point 68 to mount wire retraction mechanism 60 to inner wall portion 15 of frame 14; however, it will be understood that rivet 69 is merely illustrative, and any suitable coupling may be used to mount wire retraction mechanism 60 to inner wall portion 15 of frame 14. Although not shown in FIGS. 5B and 5C, it will be understood that wire guides 70 may also be mounted to inner wall portion 15 of frame 14 using rivets similar to rivet 69. It will be understood that in other embodiments, wire retraction mechanism 60 and/or wire guides 70 may be mounted to any other suitable portion of frame 14, including flange portion 13.

As described above with respect to wire guides 70, it will be understood that in some embodiments, wire retraction mechanism 60 may be mounted to frame 14 during manufacturing and/or assembly of frame 14. In some embodiments, wire retraction mechanism 60 may be mounted to frame 14 during assembly of frame 14 with photovoltaic panel 12. In some embodiments, wire retraction mechanism 60 may be mounted to frame 14 prior to distribution of modules 10. It will be understood that mounting wire retraction mechanism 60 during manufacturing and/or assembly as described may reduce installation time and improve quality.

It will be understood that using photovoltaic modules 10 with retractable wiring systems 50 and components thereof described in FIGS. 5-7 may allow for improved wire management during installation and wiring of photovoltaic modules similar to retractable wiring systems 20 described with respect to FIGS. 1-4. While each retractable wiring system 50 demonstrates one wire retraction mechanism 60, it will be understood that use of retractable wiring systems 50 in each successive photovoltaic module 10 will ensure that tension is maintained on each wire connection both prior to and after installation and connection. Installation and connection of photovoltaic modules 10 with retractable wiring systems 50 is described with further reference to FIGS. 8A-8D and 9A-9B.

Figure 8B:
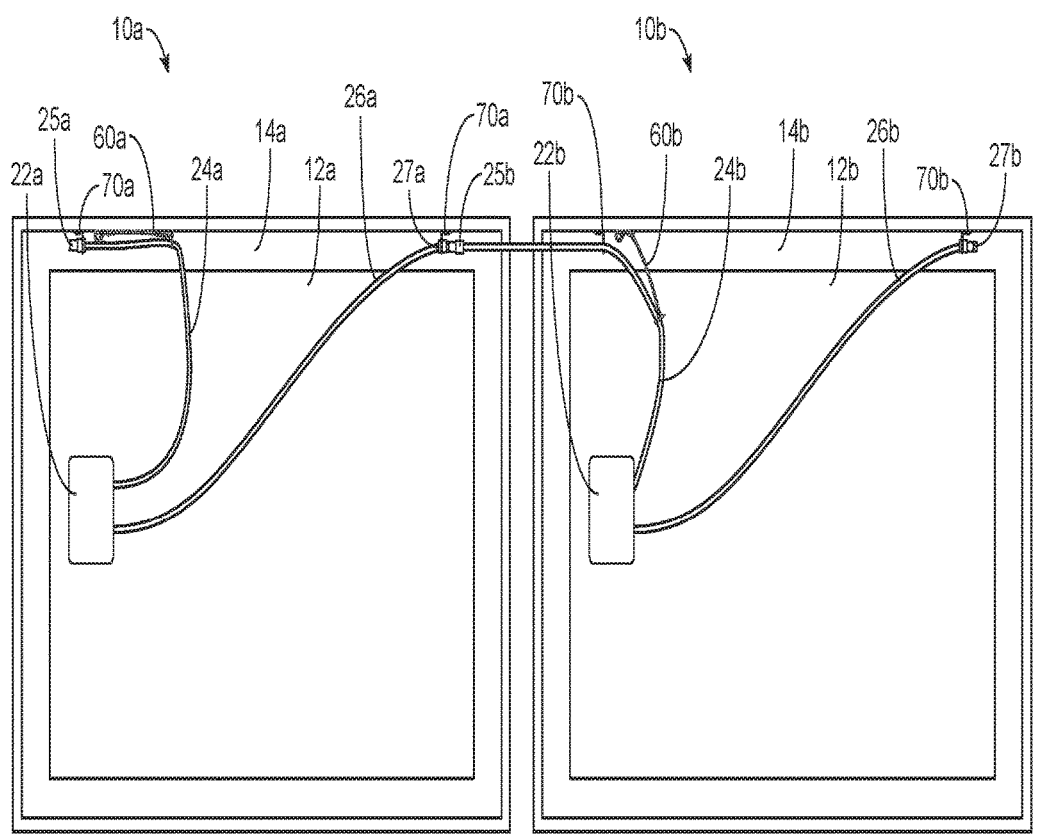
FIG. 8B shows two successive photovoltaic modules with retractable wiring systems as shown in FIGS. 5A-5C after installation and connection, according to one embodiment of the invention.
Figure 8C:
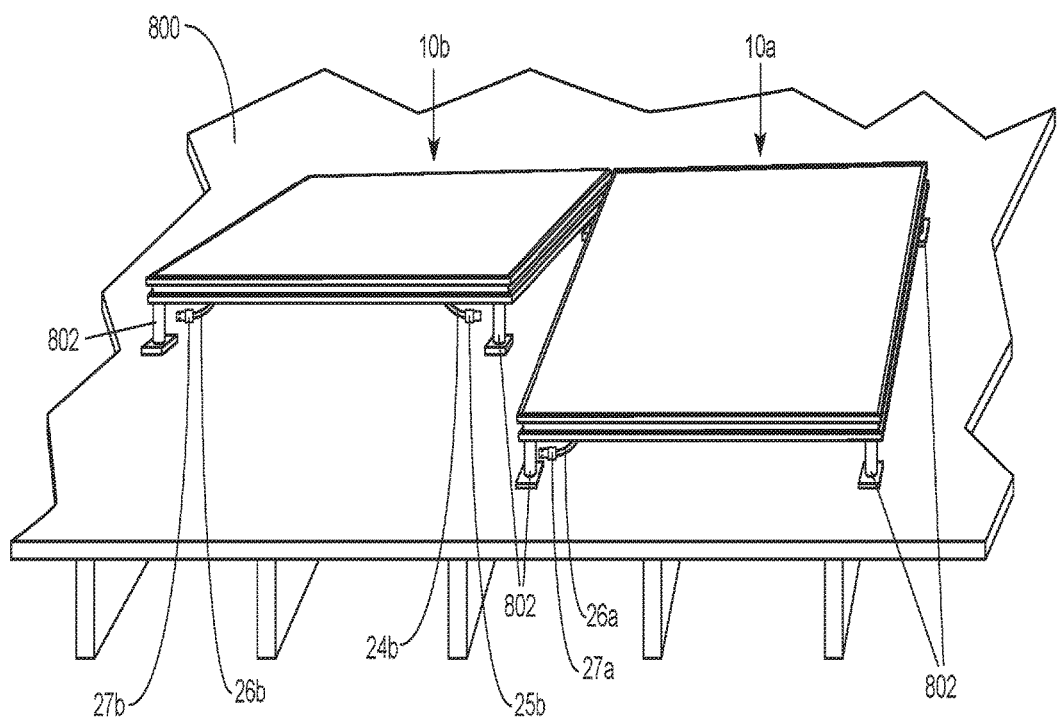
FIG. 8C shows a perspective view of the two successive photovoltaic modules depicted in FIG. 8A.

FIG. 8A shows a bottom view of two successive photovoltaic modules 10a and 10b with retractable wiring systems 50a and 50b as shown in FIGS. 5A-5C prior to being electrically connected, according to one embodiment of the invention, and FIG. 8C shows a perspective view of photovoltaic modules 10a and 10b shown in FIG. 8A. For ease of reference, components of retractable wiring systems 50a and 50b are numbered as numbered above with respect to FIGS. 5A-5C. In some embodiments, module 10a may be mechanically installed by coupling module 10a to support structure such as roof 800 (shown in FIG. 8C) using any suitable components (depicted for illustrative purposes as couplings 802), and module 10b may be placed adjacent to module 10b for mechanical and electrical coupling thereto. Prior to placing module 10b into a fully installed position, an installer may hold module 10b up in a pre-installation position, as shown in FIG. 8C, for example, to allow connection of wire 24b with wire 26a via connectors 25b and 27a respectively. An installer may then extend wire 24b in direction D (by pulling connector 25b for example) towards connector 27a of wire 26a until connector 25b and connector 27a are mated so as to couple wire 24b and wire 26a. In some embodiments, installer may hold module 10b in its pre-installation position as shown in FIG. 8C with one hand, and extend wire 24b to couple with wire 26a with the other hand.

Figure 8D:
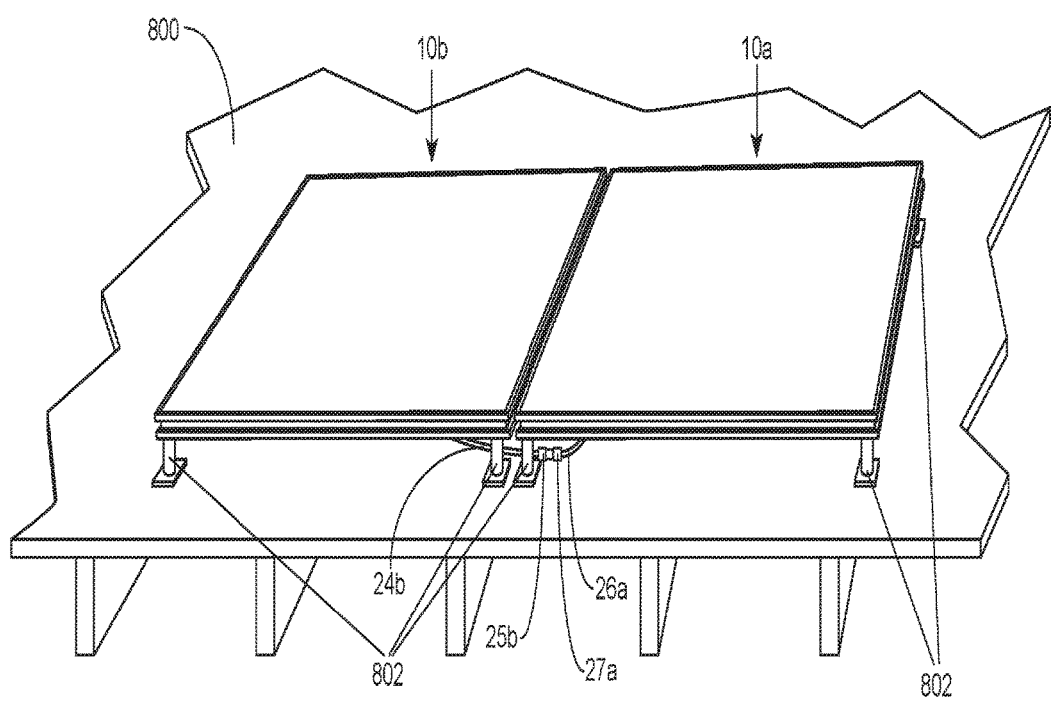
FIG. 8D shows a perspective view of the two successive photovoltaic modules depicted in FIG. 8B.

Once wire 26a is coupled to wire 24b, an installer may move module 10b into an installed position coupled to roof 800 using suitable couplings 802 as shown in FIG. 8D. As described above with respect to FIGS. 5A-5C, and as shown in FIG. 8B, which shows the bottom view of photovoltaic modules 10a and 10b after installation and connection, wire retraction mechanism 60b may provide tension to the coupled combination of wires 26a and 24b. Specifically, it can be seen that retraction mechanism 60b may rotate from its position in FIG. 8A to its position in FIG. 8B in response to extension of wire 24b towards wire 26a while spring 62b maintains tension to oppose further rotation and maintain the position of wires 26a and 24b. The tension provided by retraction mechanism 60b may ensure that the coupled combination of wires 26a and 24b remain close to the bottom surface of panels 12a and/or 12b and away from roof 800. It will be understood that depending on the designed tension provided by spring 62b, the location of junction boxes 22a and 22b, and the lengths of wires 26a and 24b, the connection point between wires 26a and 24b once released may fall entirely below module 10a (as shown in FIG. 8B), entirely below module 10b, or fall somewhere in between modules 10a and 10b. In some embodiments it may be desirable to design retractable wiring systems 50 so that the connection points fall below one or the other module as described above. It will be understood that while wires 24 and 26 of a given module 10 do not cross in the arrangement depicted in FIGS. 8A and 8B, in some embodiments, wires 24 and 26 may be crossed when connected to adjacent terminals in case the location of the positive and negative terminals of junction boxes 22 requires crossing of wires for proper connection.

Figure 9A:
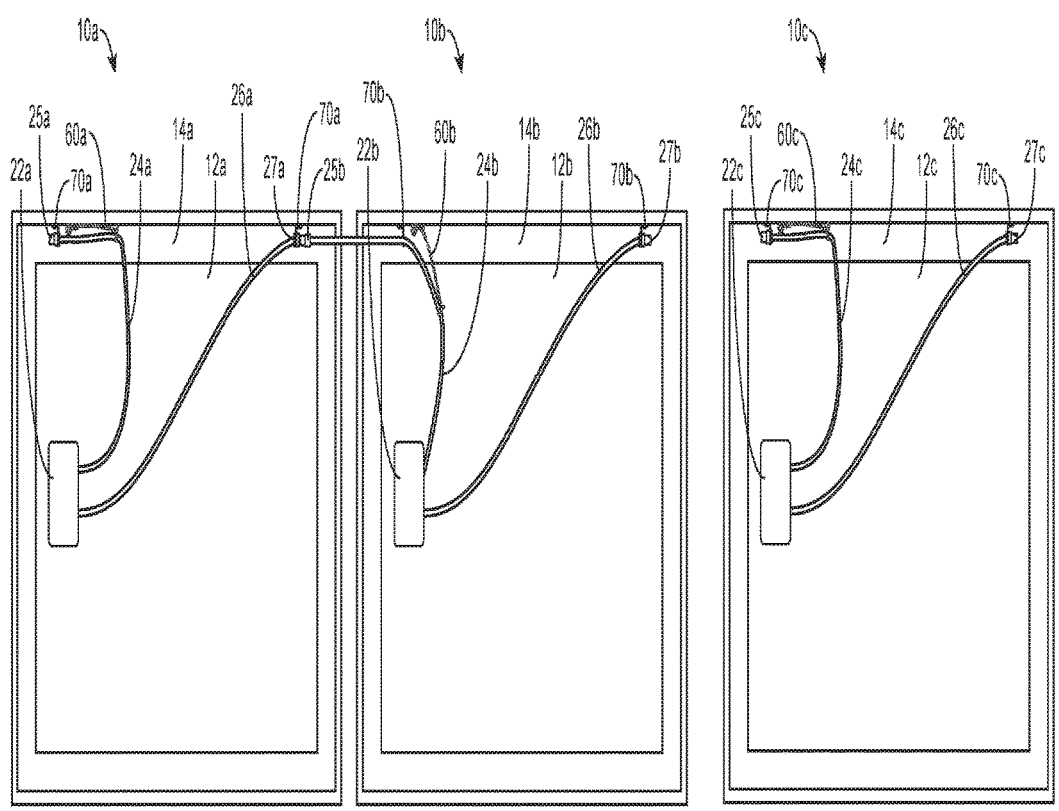
FIG. 9A shows two successive photovoltaic modules after installation, and connection as shown in FIG. 8B, with a third successive photovoltaic module in a pre-installed position, according to one embodiment of the invention.

Once module 10a and 10b are electrically connected and both moved to installed positions on roof 800, a third photovoltaic module may be placed into pre-installation position as described above for electrically coupling to module 10b. FIG. 9A shows modules 10a and 10b after installation and connection as shown in FIG. 8B with a third successive photovoltaic module 10c placed in a pre-installed position, according to one embodiment of the invention. As described above, an installer may hold module 10c up in a pre-installation position to allow connection of wire 24c with wire 26b via connectors 25c and 27b respectively. An installer may then extend wire 24c towards connector 27b of wire 26b until connector 25c and connector 27b are mated so as to couple wire 24c and wire 26b.

Once wire 26b is coupled to wire 24c, an installer may move module 10c into an installed position coupled to roof 800 using suitable couplings 802. FIG. 9B shows a bottom view of modules 10a-c after installation and electrical connection, according to one embodiment of the invention. As described above with respect to FIG. 8B, wire retraction mechanism 60c may provide tension to the coupled combination of wires 26b and 24c. Similar to retraction mechanism 60b, it can be seen that retraction mechanism 60c may rotate from its position in FIG. 9A to its position in FIG. 9B in response to extension of wire 24c towards wire 26b while spring 62c maintains tension to oppose further rotation and maintain the position of wires 26b and 24c. As with tensioniong mechanism 60b, the tension provided by retraction mechanism 60c may ensure that the coupled combination of wires 26b and 24c remain close to the bottom surface of panels 12b and/or 12c and away from roof 800.

It will be understood that any number of successive modules 10 with retractable wiring mechanisms 50 may be installed as described above as desired to make up a photovoltaic array, and that doing so will ensure each coupled combination of wires 24 and 26 remains in a desired position close to the bottom surface of modules 10 and away from roof 800. Moreover, it will be understood that successive photovoltaic modules 10 may be positioned in the array in successive rows and the orientation of the modules may be reversed in the successive rows such that the distance between junction boxes in adjacent rows is minimized. For example, in a first row, junction boxes may be positioned near a bottom side of the modules in the first row, and in a second row adjacent to the first row, junction boxes may be positioned near a top side of the modules in the second row, and so on. It will be understood that this arrangement may allow for ease of connection between adjacent modules at the end of each row.

Figure 10:
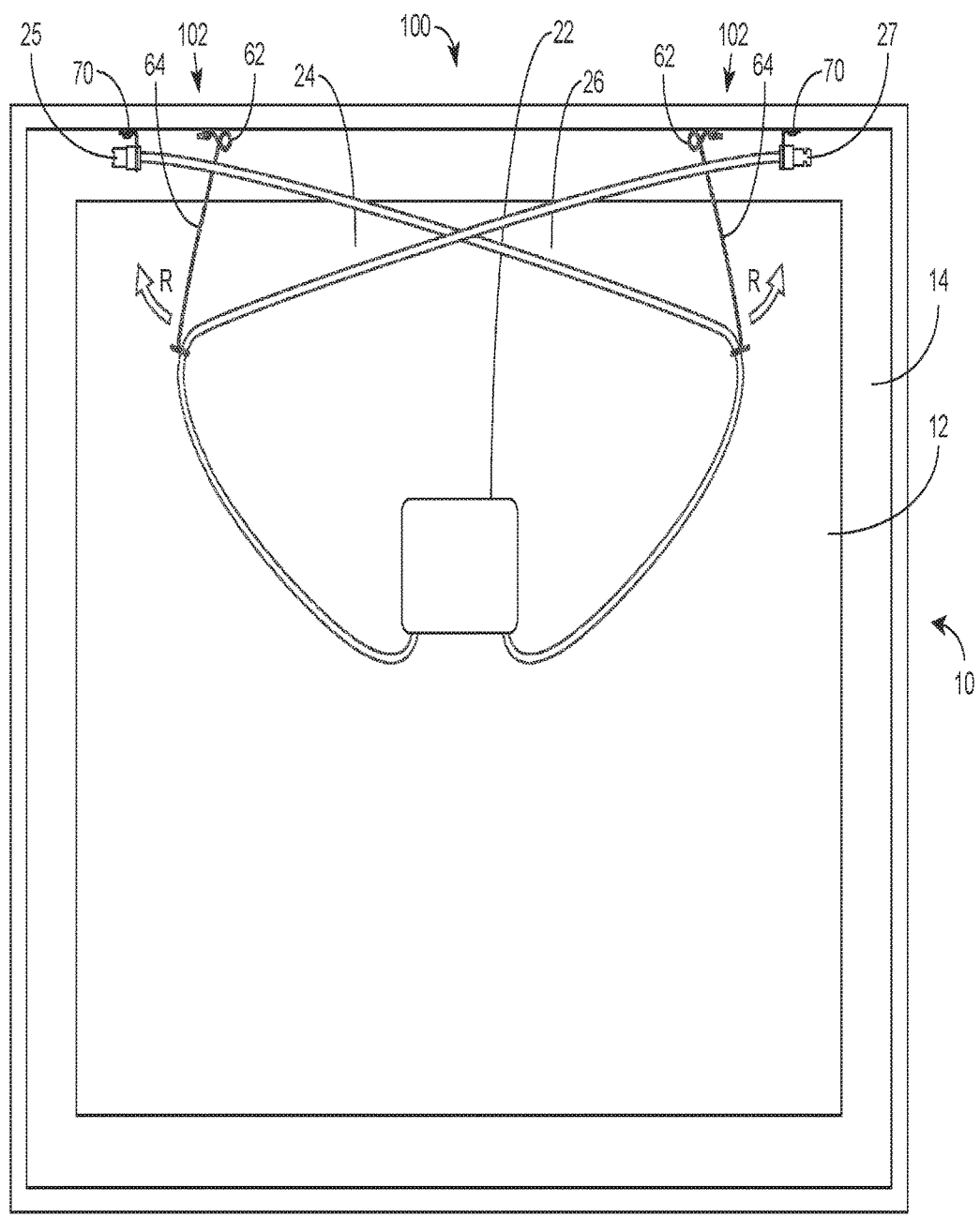
FIG. 10 shows a retractable wiring system on a photovoltaic module, according to one embodiment of the invention.

FIG. 10 shows a bottom view of photovoltaic module 10 with retractable wiring system 100, according to another embodiment of the invention. As described above with respect to FIGS. 1-5C, photovoltaic module 10 may include photovoltaic panel 12 and frame 14. As with retractable wiring system 20 of FIGS. 1-4 and retractable wiring system 50, retractable wiring system 100 may include junction-box 22 with wires 24 and 26 extending therefrom and terminating in connectors 25 and 27 respectively. As described above with respect to FIGS. 1-4, wires 24 and 26 may be connected via connectors 25 and 27 to wires of two separate adjacent photovoltaic modules so as to electrically couple positive and negative terminals of junction-box 22 to corresponding negative and positive terminals of junction boxes of two adjacent photovoltaic modules. In this embodiment, however, wires 24 and 26 may cross paths under module 10 in order to couple to opposite terminals of junction boxes of adjacent photovoltaic modules.

Retractable wiring system 100 may also include wire retraction mechanisms 102 and wire guides 70. Wire guides 70 may operate similar to wire guides 70 described above with respect to FIGS. 5A and 7 and may be shaped to receive the back side of connectors 25 and 27. As described above with respect to FIGS. 5A and 7, wire guides 70 may be made of a wire form and may have partial looping portion 72 for receiving the back end of connectors 25 and 27 and connection point 74 for mounting wire guides to frame 14. As described above, wire guides 70 may be mounted to frame 14 during manufacturing and/or assembly of frame 14. In some embodiments, wire guides 70 may be mounted to frame 14 during assembly of frame 14 with photovoltaic panel 12. In some embodiments, wire guides 70 may be mounted to frame 14 prior to distribution of modules 10. It will be understood that mounting wire guides 70 during manufacturing and/or assembly as described may reduce installation time and improve quality.

Each of wire retraction mechanisms 102 may operate similarly to wire retraction mechanism 60 and wire retraction mechanism 30 except that wire retraction mechanisms 102 may urge rotating lever arms 64 to rotate outwardly, in directions R, since wires 24 and 26 cross paths with each other as described above. It will be understood that this arrangement may allow tension to be maintained in wires 24 and 26 so as to pull them to sit in wire guides 70 as shown. As described above with respect to FIGS. 5A-C and 6, wire retraction mechanisms 102 may each be made of a single wire form including connection point 68, spring 62, rotating lever 64, and free end 66. Alternatively, wire retraction mechanism 102 may include any of spring 62, rotating lever 64, and free end 66 as separate components coupled together by any suitable couplings. As described above with respect to wire guides 70, it will be understood that in some embodiments, wire retraction mechanisms 102 may be mounted to frame 14 during manufacturing and/or assembly of frame 14. In some embodiments, wire retraction mechanisms 102 may be mounted to frame 14 during assembly of frame 14 with photovoltaic panel 12. In some embodiments, wire retraction mechanisms 102 may be mounted to frame 14 prior to distribution of modules 10. It will be understood that mounting wire retraction mechanisms 102 during manufacturing and/or assembly as described may reduce installation time and improve quality.

Figure 11:
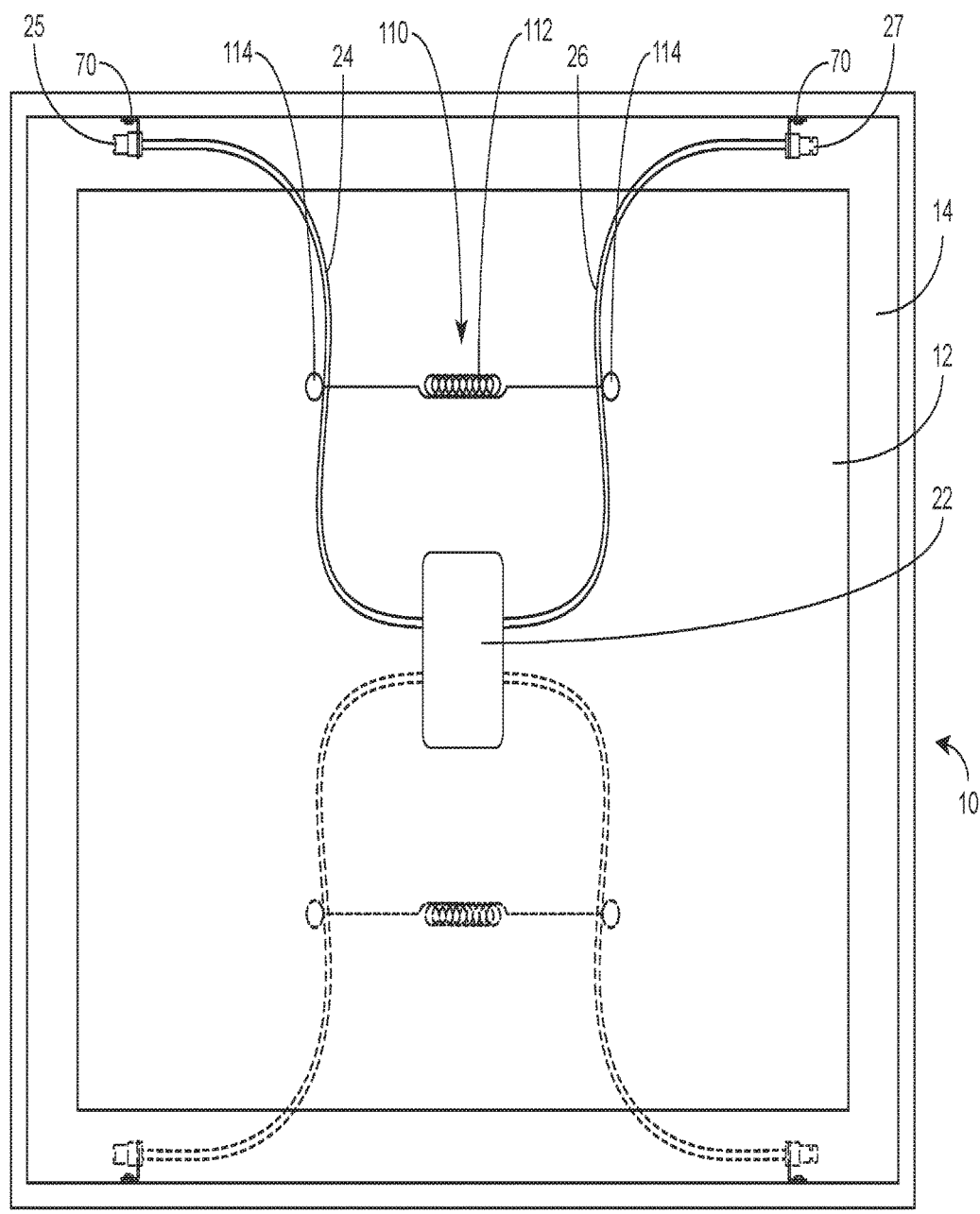
FIG. 11 shows a retractable wiring system on a photovoltaic module, according to one embodiment of the invention.

FIG. 11 shows a bottom view of photovoltaic module 10 with retractable wiring system 110, according to another embodiment of the invention. As described above with respect to FIGS. 1-5C and 10, photovoltaic module 10 may include photovoltaic panel 12 and frame 14. As with retractable wiring system 20 of FIGS. 1-4, retractable wiring system 50, and retractable wiring system 100, retractable wiring system 110 may include junction-box 22 with wires 24 and 26 extending therefrom and terminating in connectors 25 and 27 respectively. As described above with respect to FIGS. 1-4, 5A, and 10, wires 24 and 26 may be connected via connectors 25 and 27 to wires of two separate adjacent photovoltaic modules so as to electrically couple positive and negative terminals of junction-box 22 to corresponding negative and positive terminals of junction boxes of two adjacent photovoltaic modules.

Retractable wiring system 110 may include spring 112 positioned between wires 24 and 26. Spring 112 may urge mid-sections of wires 24 and 26 together to provide constant tension on wires 24 and 26. In some embodiments, spring 112 may be connected to pulleys or cylinders 114, which may be positioned around wires 24 and 26, as shown. In some embodiments, pulleys 114 may be affixed to particular points on wires 24 and 26 to avoid slipping along the wires and losing the desired tension. Retractable wiring system 110 may also include wire guides 70 which may operate similarly to wire guides 70 described above with respect to FIGS. 5A, 7, and 10. It will be understood that an advantage of the design of retractable wiring system 110 may be that wires 24 and 26 may be flipped down to the position shown in dotted lines should the installer wish to make the module-to-module connections from the other side of the module. Accordingly, wiring system 110 may allow for increased installation flexibility. It will be understood that while wires 24 and 26 of module 10 do not cross in the arrangement depicted in FIG. 11, in some embodiments, wires 24 and 26 may be crossed when connected to adjacent terminals in case the location of the positive and negative terminals of junction boxes 22 requires crossing of wires for proper connection.

In some embodiments, spring 112 and pulleys 114 may be installed on wires 24 and 26 during assembly (i.e. mounting) of junction box 22 with photovoltaic panel 12. In some embodiments, spring 112 and pulleys 114 may be installed on wires 24 and 26 prior to mounting junction box 22 on photovoltaic panel 12. It will be understood that installing spring 112 and pulleys 114 prior to installation as described may reduce installation time and improve quality.

Figure 12:
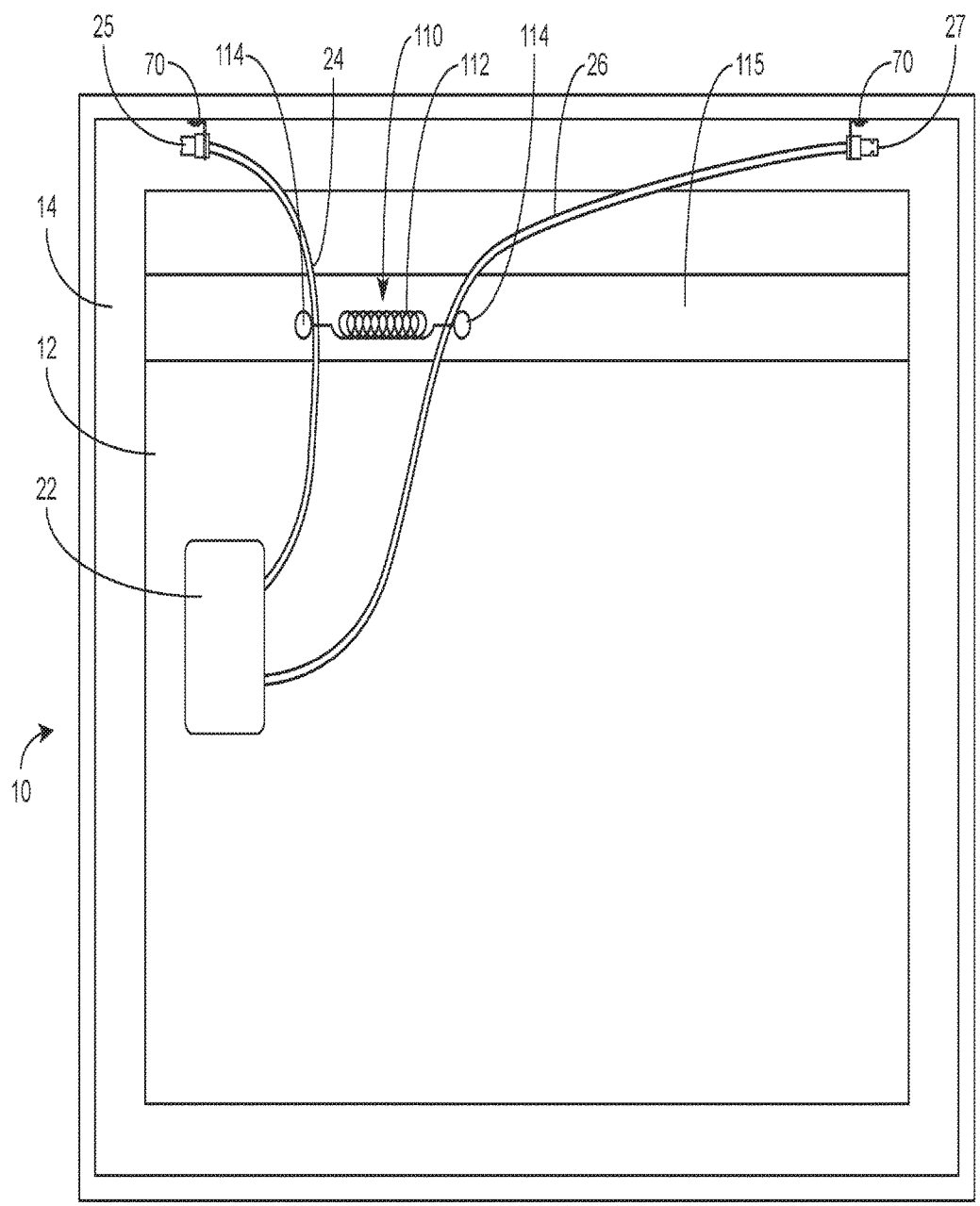
FIG. 12 shows a retractable wiring system on a photovoltaic module, according to one embodiment of the invention.

FIG. 12 shows a bottom view of photovoltaic module 10 with retractable wiring system 110, according to another embodiment of the invention. As described above with respect to FIGS. 1-5C, 10, and 11, photovoltaic module 10 may include photovoltaic panel 12 and frame 14. As with retractable wiring system 20 of FIGS. 1-4, retractable wiring system 50, and retractable wiring system 100, retractable wiring system 110 may include junction-box 22 with wires 24 and 26 extending therefrom and terminating in connectors 25 and 27 respectively. As described above with respect to FIGS. 1-4, 5A, and 10, wires 24 and 26 may be connected via connectors 25 and 27 to wires of two separate adjacent photovoltaic modules so as to electrically couple positive and negative terminals of junction-box 22 to corresponding negative and positive terminals of junction boxes of two adjacent photovoltaic modules. However, as shown in FIG. 12, junction-box 22 may be disposed in a different location and may require connection to adjacent photovoltaic modules in the landscape orientation as shown as opposed to the portrait orientation shown in FIG. 11. Accordingly, track 115 may be provided as shown in FIG. 12, in which spring 112 and pulleys 114 are restrained. It will be understood that an advantage of this design is that it can be used when the junction box 22 is positioned at the location shown since track 115 may prevent spring 112 and pulleys 114 from slipping down wires 24 and 26 to a position where they would fail to provide tension on the wires. In some embodiments, track 115 may be incorporated in a portion of frame 14. For example, although not depicted in FIG. 12, frame 14 may include an extrusion extending from an inward facing portion of frame 14 with an inward facing groove that forms track 115 in which spring 112 and pulleys 114 may sit and provide tension on wires 24 and 26 at particular points, without slipping. In some embodiments, track 115, spring 112, and pulleys 114 may be installed during manufacturing and/or assembly of module 10 and/or prior to distribution of modules 10. It will be understood that installing track 115, spring 112, and pulleys 114 prior to installation as described may reduce installation time and improve quality.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments will be apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A photovoltaic module comprising:
a photovoltaic panel;
a frame supporting the photovoltaic panel;
a junction-box mounted onto the photovoltaic panel;
first and second wires extending from the junction-box;
a first wire guide mounted onto the frame, wherein the first wire is received into the first wire guide; and
a wire retraction mechanism mounted onto the frame, the wire retraction mechanism configured to maintain tension on the first wire, wherein the wire retraction mechanism comprises:
a rotating lever arm mounted to the frame, and
a spring bias coupled to the rotating lever arm urging the lever arm to rotate such that the lever arm maintains tension on the first wire in the first wire guide.

2. The photovoltaic module of claim 1, wherein the wire retraction mechanism is configured to pull the connector of the first wire in the first wire guide towards the first wire guide to maintain tension on the first wire in the first wire guide.

3. The photovoltaic module of claim 1, wherein a free end of the rotating lever arm wraps around the first wire in the first wire guide.

4. The photovoltaic module of claim 1, further comprising a second wire guide mounted onto the frame, wherein the second wire is received into the second wire guide, and wherein the wire retraction mechanism is configured to maintain tension on at least one of the first wire and the second wire.

5. The photovoltaic module of claim 4, wherein the rotating lever arm is a first rotating lever arm and wherein the wire retraction mechanism further comprises:
a second rotating lever arm mounted onto the frame, and
the spring bias coupled to both the first rotating lever arm and the second rotating lever arm, urging both the lever arms to rotate such that the lever arms maintain tension on both the first wire and the second wire.

6. The photovoltaic module of claim 1, wherein the first wire terminates in a connector configured to electrically couple the first wire to a third wire extending from a second junction-box mounted onto a second photovoltaic panel, wherein the wire retraction mechanism is configured to maintain tension in each of the first and third wires when the first and third wires are electrically coupled.

7. The photovoltaic module of claim 6, wherein the second wire terminates in a connector configured to electrically couple to a fourth wire extending from a third junction-box mounted onto a third photovoltaic panel.

8. The photovoltaic module of claim 1, wherein the wire retraction mechanism comprises a wire form extending from a first end mounted to the frame to a second end wrapped around the first wire.

9. The photovoltaic module of claim 8, wherein the wire form comprises a spring disposed at the first end and configured to urge the wire form to rotate about the end mounted to the frame so as to maintain tension on the first wire.

10. A photovoltaic module comprising:
a photovoltaic panel;
a frame supporting the photovoltaic panel;
a junction-box mounted onto the photovoltaic panel;
first and second wires extending from the junction-box;
a first wire guide mounted onto the frame, wherein the first wire is received into the first wire guide; and
a wire retraction mechanism mounted onto the frame, the wire retraction mechanism configured to maintain tension on the first wire, wherein the wire retraction mechanism comprises a wire form extending from a first end mounted to the frame to a second end wrapped around the first wire, and wherein the wire form comprises a spring disposed at the first end and configured to urge the wire form to rotate about the end mounted to the frame so as to maintain tension on the first wire.

11. The photovoltaic module of claim 10, wherein the first wire terminates in a connector configured to electrically couple the first wire to a third wire extending from a second junction-box mounted onto a second photovoltaic panel, wherein the wire retraction mechanism is configured to maintain tension in each of the first and third wires when the first and third wires are electrically coupled.

12. The photovoltaic module of claim 11, wherein the second wire terminates in a connector configured to electrically couple to a fourth wire extending from a third junction-box mounted onto a third photovoltaic panel.

13. The photovoltaic module of claim 10, wherein the wire retraction mechanism is configured to pull the connector of the first wire in the first wire guide towards the first wire guide to maintain tension on the first wire in the first wire guide.

14. A photovoltaic module comprising:
a photovoltaic panel;
a frame supporting the photovoltaic panel;
a junction-box mounted onto the photovoltaic panel;
first and second wires extending from the junction-box;
a first wire guide mounted onto the frame, wherein the first wire is received into the first wire guide; and
a wire retraction mechanism mounted onto the frame, the wire retraction mechanism configured to maintain tension on the first wire, wherein the wire retraction mechanism comprises a spring positioned between the first wire and the second wire, and wherein the spring urges the first wire and the second wire together.

15. The photovoltaic module of claim 14, wherein the spring is coupled to each of the first wire and the second wire by pulleys positioned around each of the first wire and the second wire.

16. The photovoltaic module of claim 14, wherein the first wire terminates in a connector configured to electrically couple the first wire to a third wire extending from a second junction-box mounted onto a second photovoltaic panel, wherein the wire retraction mechanism is configured to maintain tension in each of the first and third wires when the first and third wires are electrically coupled.

17. The photovoltaic module of claim 16, wherein the second wire terminates in a connector configured to electrically couple to a fourth wire extending from a third junction-box mounted onto a third photovoltaic panel.

18. The photovoltaic module of claim 14, wherein the wire retraction mechanism is configured to pull the connector of the first wire in the first wire guide towards the first wire guide to maintain tension on the first wire in the first wire guide.

19. The photovoltaic module of claim 14, wherein the wire retraction mechanism comprises a wire form extending from a first end mounted to the frame to a second end wrapped around the first wire.

* * * * *